United States Patent [19]

Agut Sanz

[11] Patent Number: 5,341,080

[45] Date of Patent: Aug. 23, 1994

[54] APPARATUS AND THREE PHASE INDUCTION MOTOR STARTING AND STOPPING CONTROL METHOD

[75] Inventor: Juan Agut Sanz, Terrassa, Spain

[73] Assignee: General Electric Company, New York, N.Y.

[21] Appl. No.: 972,821

[22] Filed: Nov. 6, 1992

[30] Foreign Application Priority Data

Nov. 6, 1991 [ES] Spain ................. 9200923

[51] Int. Cl.$^5$ ........................... H02P 5/40
[52] U.S. Cl. ................. 318/778; 318/779; 318/809; 318/805
[58] Field of Search ............... 318/430–434, 318/700–832

[56] References Cited

U.S. PATENT DOCUMENTS

| | | | |
|---|---|---|---|
| 4,539,514 | 9/1985 | Espelage et al. | 318/778 |
| 4,562,396 | 12/1985 | Espelage et al. | 318/809 |
| 4,636,702 | 1/1987 | Hedges | 318/729 |
| 4,712,054 | 12/1987 | Boldt | 318/758 |
| 4,723,104 | 2/1988 | Rohatyn | 318/813 |
| 4,931,715 | 6/1990 | Lee et al. | 318/709 |
| 5,003,242 | 3/1991 | Liber | 318/778 |
| 5,136,216 | 8/1992 | Wills et al. | 318/747 X |
| 5,151,642 | 9/1992 | Lombardi et al. | 318/779 |
| 5,151,853 | 9/1992 | Tatara et al. | 363/160 |
| 5,153,489 | 10/1992 | Unsworth et al. | 318/490 |
| 5,187,419 | 2/1993 | DeLange | 318/805 |

*Primary Examiner*—Paul Ip
*Attorney, Agent, or Firm*—Richard A. Menelly

[57] ABSTRACT

The first, second and third switches within the first, second and third phases of a three phase motor controller are selectively operated to control the both the starting torque and the stopping torque of the motor. A preselected time delay before operating the switches within the individual phases allows the starting torque and the stopping torque to be controlled over a wide range of operation.

3 Claims, 3 Drawing Sheets

APPARATUS AND THREE PHASE INDUCTION MOTOR STARTING AND STOPPING CONTROL METHOD

BACKGROUND OF THE INVENTION

The starting of three phase induction motors can be controlled by electromechanical devices that are well-known. Some currently-employed methods include starting with series-connected reactors or resistors and starting by changing the connections of the windings from an initial radial connection to a delta connection during operation.

Starting the motors using previously known devices involves some inherent inconveniences. Step-wise application of the voltage to the motor windings, for example, causes transitory electrical problems.

Power semiconductor devices are also used to progressively and continuously apply voltage to the motor windings durings starting. This allows adjustment of the RMS voltage applied to the motor windings and controls the RMS current during motor starting.

World Patent PCT WO84/04005 describes three phase alternating current induction motor starting wherein the conduction angle during start-up is limited in order to prevent non-conduction within any of the motor windings. The control of the starting torgue is is limited however since the starting voltage is greater than 40% of the powe system voltage.

SUMMARY OF THE INVENTION

First, second and third switches are connected in series within the first, second and third phases of a three phase induction motor to control the motor start-up and operating speeds. The operation of switches is controlled by an operating program whereby the first and second switches in the first and second phases are simultaneously switched on. When the voltage waveforms reach zero, the first and second switches are simultaneously switched off and the first and third switches are simultaneously turned on after a predetermined time delay. When the voltage waveforms in the first and third phases reach zero, the first and third switches are switched off and the. second and third switches are simultaneously turned on after a predetermined time delay. The process is continued until the motor reaches it full operational speed at which time all the switches are turned on.

GENERAL DESCRIPTION OF THE INVENTION

Figure 1:
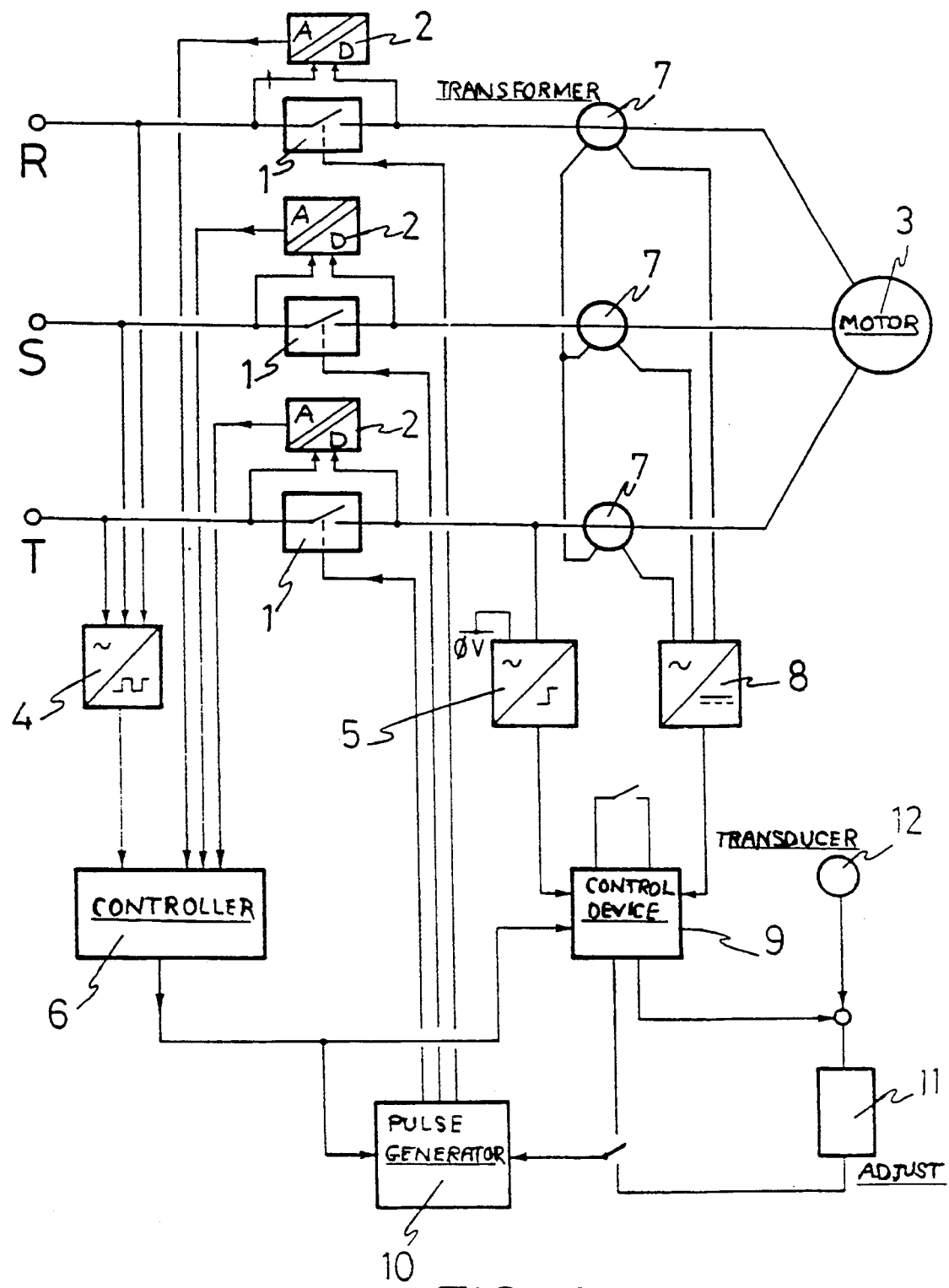
FIG. 1 is a diagrammatic representation of the motor controller unit according to the invention.

The starting and stopping of three phase induction motors is carefully controlled by delaying the conduction of semiconductor switches connected in series between each of the three phases of the electrical distribution system and the three phases of the motor. The semiconductor switches comprise thyristors and triacs that become conductive upon applying a control signal and remain conductive until the control signal is removed. During motor starting, two of the semiconductor switches (hereafter "switches") are simultaneously turned on within two phases of the distribution system while the remaining switch in the third phase remains off. The switching of two of the three phases causes discontinuous operation of the motor windings such that the RMS voltage applied to the motor is reduced to a value less than 40% of the systems voltage for closer control of the motor speed during start-up.

One advantage of simultaneously switching a pair of switches within two phases of the windings is that upon occurrence of a temporary turn-off of either of the switches, the motor current is sustained by operation of the next two semiconductor switches in the continuous switching arrangement.

Upon motor start-up, the first pair of semiconductor switches are turned on after a delay of between 170 and 180 electrical degrees measured from the zero crossing of the voltage waveform associated with the two phases that are being switched on. For a three phase motor having phases R, S, T, the switching order of the associated switches R, S, T is as follows. After switches R and S are switched on, switches S and T are turned on a predetermined time delay after the R and S voltage waveforms cross the zero axis. The R and T switches are turned on a predetermined time delay after the S and T voltage waveforms have crossed the zero axis. The cycle is repeated turning on the R and S switches, the S and T switches and the R and T switches with a similar intervening delay. The initial time delay during start-up is larger than the subsequent time delay close to when the motor becomes fully operational. The time delay is reduced from an initial value of 170 to 180 electrical degrees to a final value of 140 to 150 electrical degrees, depending on the motor torque generated during start-up.

The motor start-up usually takes from 2 to 10 cycles of the electrical distribution system frequency which allows the starting voltage to be gradually applied thereby reducing transitory oscillations which otherwise would cause fluctuation of the motor torque.

Once the start-up process nears completion, a threshold voltage is applied to the switches to allow the RMS value of the voltage applied to the motor to increase continuously without turning off any of the switches. The "conduction angle" is defined herein as the time duration that the semiconductor switches are on to permit current transfer to the motor. The transition of the start-up from the initial discontinuous stage, when the switches are off in two of the phases, to the continuous stage, when the switches are on in at least two of the phases, occurs when the conduction angle of the switch on-time is equal to or greater than 120 electrical degrees for each half cycle of the supply voltage.

As described below in greater detail, the transition from the discontinuous stage to the continuous stage occurs when the zero crossing of the current waveform is used to control the switching times of the semiconductor switches rather than the zero crossing of the voltage waveform. The specific conduction angles are determined by means of a pulse generator for time analysis or by a tachometer for velocity analysis.

During motor start-up, the voltage in each phase is compared with a predetermined voltage value slightly less than the motor when fully operational. When the measured voltage exceeds the predetermined value, the firing angle of the switches is rapidly increased until the voltage in each phase reaches the full operating value. Once the full operating voltage has been applied to the motor, the value can be adjusted to the full line voltage value, or reduced in proportion to the load supplied by the motor to optimize the power factor.

During motor stopping, two options are available according to the teachings of the invention. The first option is to simultaneously turn off the switches and allow the motor voltage to rapidly fall to zero. The other method is to progressively reduce the firing angles of the switches to produce a controlled deceleration of the motor. An algorithm resident in the motor controller circuit controls the turn-off of the switches as a non-linear function of time.

DESCRIPTION OF THE PREFERRED EMBODIMENT

The three phase induction motor controller of the invention is best seen by referring now to FIG. 1.

Three semiconductor switches 1 such as thyristors or triacs are connected in series between the three phases R, S, T of a three phase electrical power distribution system and the corresponding phases within a three phase induction motor 3. Each of the switches are connected in anti-parallel to allow current flow in both directions on both positive and negative cycles of the power system.

Corresponding A/D converters are connected across the switches to provide digital indication (0,1) of the conductive and nonconductive states of the switches.

A voltage comparator functioning as a zero-crossing detector 4 connects with each four phase conductor and provides input to an electronic controller 6 which conatins an EEPROM which receives input from each of the switches as to the conductive and non-conductive states thereof.

An EMP detector and voltage comparator 5 is connected within one phase of the power system. The comparator compares the voltage within each phase when the switch is non-conductive to a predetermined value and provides input to the switch controller 9. The voltage value obtained when the switch is non-conductive is an indication of the motor velocity and allows the switch controller 9 to change the conduction angle of each of the switches 1 in the manner described earlier. The current transformers 7 provide input to the current comparator 8 wherein the current in each phase is compared to a predetermined current value and allows the switch controller 9 to switch on all of the switches when the predetermined current value is exceeded.

The switch controller 9 comprises an Intel type 80535 microprocessor programmed to analyze the information received from the controller 6 as to the zero crossing of the voltage and the conductive states of the switches. The controller applies control signals to the pulse generator 10 for controlling the successive operation of the switches within each of the phases during start-up as described earlier.

When the motor controller is operated by means of an adjustable velocity operating program resident in the switch controller 9, the signal generated by the velocity transducer 12 is compared with a reference value contained within the switch controller 9 that is coupled with the motor 3. The velocity transducer comprises either a tachometer or a pulse generator that produces a signal output proportional to the real time value of the motor velocity. The switch controller 9 connects with an adjustor unit 11 usually an EEPROM, which contains a reference value of the velocity contained within the adjustor unit 11. The controller 9 then activates the pulse generator to turn on the switches 1 in the same manner as described earlier for the adjustable voltage operating program.

The pulse generator 10 connecting with the switch controller 9, controller 6 and switches 1 receives the zero crossing data and the data indicating the on/off status of the switches. The control signals generated by the switch controller 9 insures that the associated pair of switches within the motor phases are simultaneously switched on and off in accordance with the operating programs described earlier, such that two phases of the motor are supplied with current at all times during motor start-up.

Figure 2:
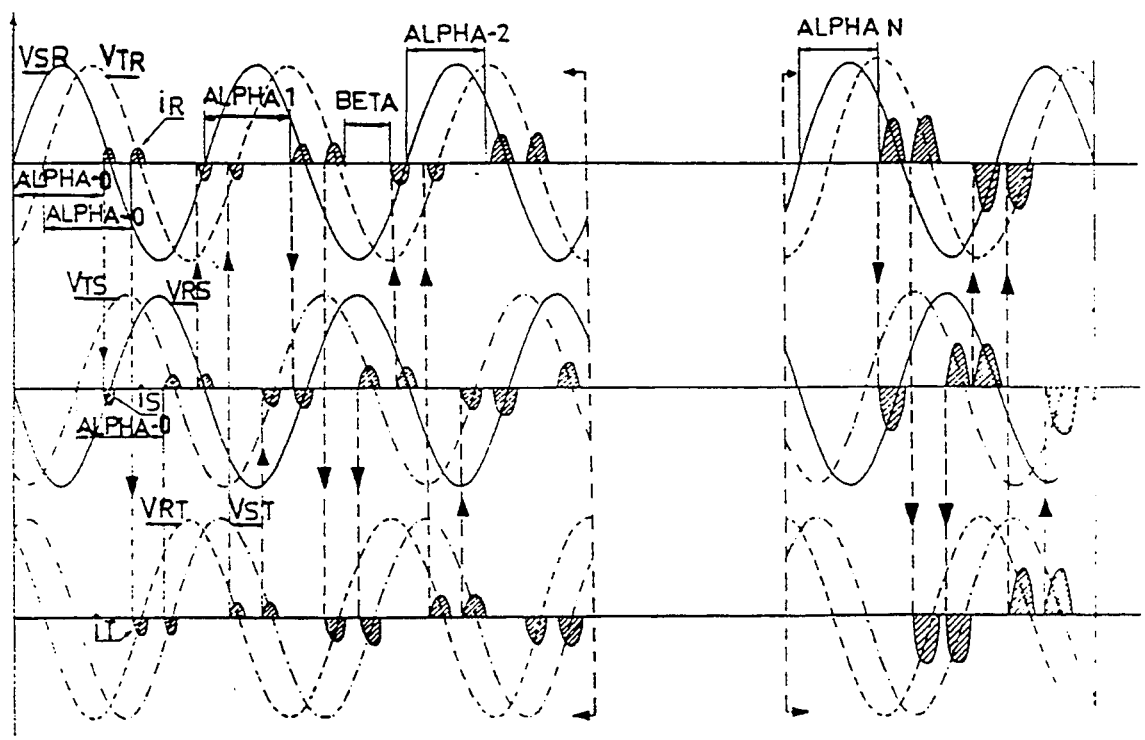
FIG. 2 is a graphic representation of the firing angles of the semiconductor switches of FIG. 1 during motor start-up.
Figure 3:
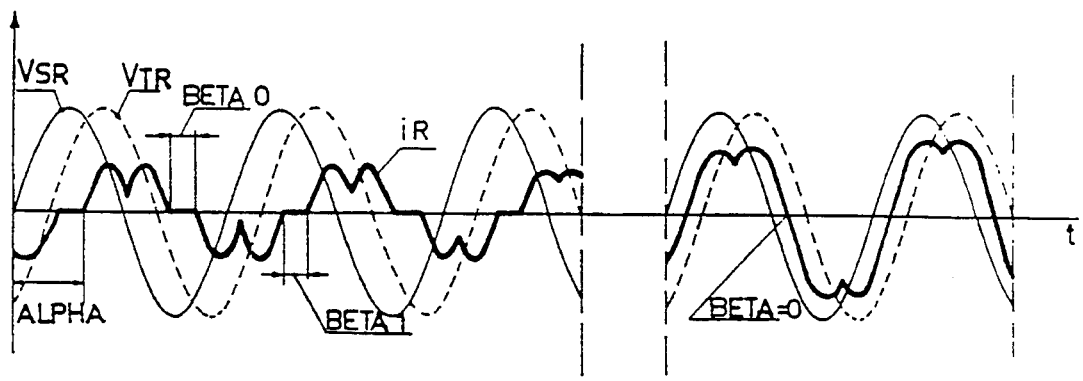
FIG. 3 is a graphic representation of the motor current within each phase of a three-phase motor during motor start-up.
Figure 4:
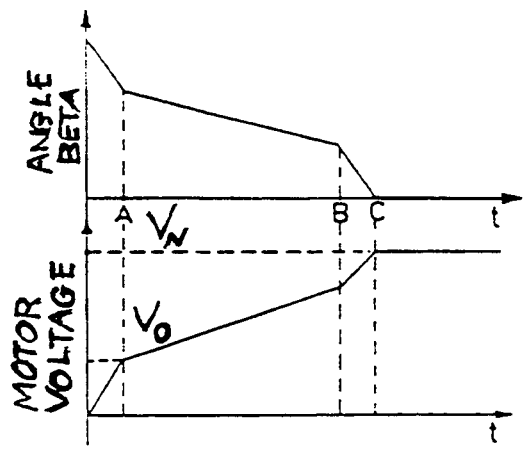
FIG. 4 is a graphic representation of the voltage across the motor as a function of time.

The voltage waveforms VS, VR, VT associated with the three power phases S, R, T are depicted in FIG. 2. The voltages generated across the corresponding pair of switches that are simultaneously turned on by the switch controller are designated VSR, VTR, VTS, VRS and VRT, VST, respectively. The currents within the power phases are designated iR, iS and iT. In accordance with the teachings of the invention, two of the switches S, T are fired simultaneously to provide voltages VSR, VTR and corresponding currents iR, iS in the R-S phases. It is noted that the switches S, R are anti-parallel such that the currents iR, iS are 180 degrees out of phase. After the zero voltage crossing of the VSR, VTR waveforms and a predetermined delay alpha-0, the next two switches S, T are turned on resulting in currents iS, iT. The delay angle alpha-0 is predetermined within the control device 9 and ranges between 170-180 electrical degrees measured from the zero crossing of the switch voltage waveforms. The delay angle then decreases in accordance with the program from alpha-0, alpha-1 to alpha N which is preset between 140 and 150 electrical degrees. The current in each two of the three phases then remains on for gradually increasing increments as the delay angle continues to decrease. When the delay reaches alpha-N, the time delay for turning on the switches is then determined by the electrical angle beta measured between the zero crossing of the current waveforms within any of the three phases. The time delay beta also decreases in accordance to a program contained within the control device 9. As shown in FIG. 3, the time delay beta decreases from beta 0, beta 1 to a final value of beta=0, at which point the current remains on continuously within each of the three phases. The current zero reference is selected during motor start-up to avoid the differences in the zero crossing of the phase voltages created by the phase angle associated with the particular motor. The phase angle being defined as the number of electrical degrees that the voltage leads the current in all three phases. An option provided by the arrangement of the use of the zero crossing of the phase current waveform is the sensing of the motor velocity when the time delay beta value is close to a minimum and inputting a signal to the control device 9 to immediately increase the motor operating voltage to its full value. The decrease in the time delay beta and the increase in the motor voltage for three time increments A–C is depicted in FIG. 4. It is noted that the motor voltage increases rapidly to an initial value VO, gradually increases in ramp fashion as the time delay angle beta gradually decreases to a predetermined value as indicated at B, then rapidly increases to a steady operating voltage VN as the time delay angle drops to zero.

An additional feature of the invention is the diagnostics provided by the continuous monitoring of the switches 1 by the controller 6. The failure of any of the switches during operation is immediately apparent and an indication can be given by means of additional circuitry. The loss of supply power to any of the phases is also detected in a similar manner. To distinguish between a failure of any of the switches and loss of supply power, the signals to the controller unit 6 are examined. If the phase current signals to the controller are of opposite phase, then the implication is that there is a loss of conduction in the remaining phase. If the current in the two phases are in phase, the indication is that the corresponding switch has failed and should be replaced.

There has herein been described a motor controller for a three phase motor wherein the motor start-up speed and stopping speed can be carefully controlled. The on-time of anti-parallel pairs series-connected semiconductor switches within the separate motor phases is controlled to effect the starting and stopping motor speeds. Separate programs are provided within the controller unit to set the time delays between the on and off cycles of the pairs of switches.

I claim:

1. A three phase induction motor controller comprising:
   first, second and third semiconductor switches arranged in series between first, second and third phases of a three phase induction motor and a three phase power system;
   a zero crossing detector connecting with each phase of said three phase power system for detecting zero crossings of voltage waveforms associated with said three phase power system;
   a first controller unit connecting with said zero crossing detector and said switches for synchronizing control signals to said switches in response to zero crossing data and to switch voltage data indicative of open and closed conditions of said switches;
   a pulse generator connecting with said first controller unit providing said control signals to said switches;
   an electromotive force detector connecting with one phase of said three phase power system for determining when voltage within said one phase exceeds a predetermined voltage value and providing indication when said voltage value is exceeded;
   first, second and third current transformers arranged within said first, second and third phases of said three phase power system determining current through each of said three phases;
   a level detector connecting with said current transformers for determining when current within any of said first, second or third phases exceeds a predetermined current value and providing indication when said current value is exceeded and a second controller connecting with said first controller unit, said pulse generator, said level detector and said electromotive force detector for first switching on a first pair of said first, second and third switches and then switching on a second pair of said first, second and third switches after said first pair of switches are turned off to control the start up and stopping of said three-phase induction motor.

2. The controller of claim 1 further including first, second and third A/D converters connecting with said first controller unit and said switches for providing digital indication of open and closed conditions of said switches.

3. The controller of claim 1 wherein said second pair of switches are turned on a predetermined time delay after said first pair of switches are turned off.

* * * * *